US012363165B2

United States Patent
Vangaveti

(10) Patent No.: US 12,363,165 B2
(45) Date of Patent: Jul. 15, 2025

(54) MEMORY DECOYS

(71) Applicant: G14 Solutions LLC, Stamford, CT (US)

(72) Inventor: Kiran Kumar Vangaveti, Stamford, CT (US)

(73) Assignee: G14 Solutions LLC, Stamford, CT (US)

( * ) Notice: Subject to any disclaimer, the term of this patent is extended or adjusted under 35 U.S.C. 154(b) by 60 days.

(21) Appl. No.: 17/508,788

(22) Filed: Oct. 22, 2021

(65) Prior Publication Data

US 2022/0131897 A1 Apr. 28, 2022

Related U.S. Application Data

(60) Provisional application No. 63/104,447, filed on Oct. 22, 2020.

(51) Int. Cl.
*H04L 9/40* (2022.01)

(52) U.S. Cl.
CPC .................. *H04L 63/1491* (2013.01)

(58) Field of Classification Search
CPC .................. H04L 63/145; H04L 63/1491
See application file for complete search history.

(56) References Cited

U.S. PATENT DOCUMENTS

| | | | |
|---|---|---|---|
| 8,307,432 B1* | 11/2012 | Feng | G06F 21/566 |
| | | | 726/25 |
| 10,193,918 B1* | 1/2019 | Patton | G06F 21/566 |
| 10,356,119 B1* | 7/2019 | Chang | H04L 63/1433 |
| 10,873,601 B1* | 12/2020 | Stickle | H04L 63/1416 |
| 10,893,068 B1* | 1/2021 | Khalid | G06F 21/554 |
| 2015/0026807 A1* | 1/2015 | Lutas | G06F 21/54 |
| | | | 711/6 |
| 2017/0032118 A1* | 2/2017 | Carson | G06F 21/566 |

* cited by examiner

*Primary Examiner* — Joseph P Hirl
*Assistant Examiner* — Thomas A Gyorfi
(74) *Attorney, Agent, or Firm* — Foundation Law Group LLP; J D Harriman

(57) ABSTRACT

The system implements in memory decoys to disrupt the attacker techniques. This has multiple benefits. 1) The attacker is never aware of a decoy present in memory as it is virtually indistinguishable from any regular process on an endpoint. 2) The decoys process also tracks attacker activity from a behavior perspective and predict and preempt the attackers next steps without alerting the attacker. 3) the decoy processes can then provide false information by intercepting the kernel responses to the attackers process and disrupt the attack chain. 4) the decoy processes can also pollute the responses that the attacker is expecting, thereby preventing the attacker from ever achieving execution of the endpoint. 5) The decoy processes also detect the attacker's evasion techniques and adjust accordingly to divert the attacker from ever achieving execution.

5 Claims, 4 Drawing Sheets

MEMORY DECOYS

This patent application claims priority to U.S. Provisional Patent Application 63/104,447 filed on Oct. 22, 2020, which is incorporated by reference herein in its entirety.

BACKGROUND OF THE SYSTEM

The ease of use of computer networks, the Internet, and the Web, have come at the cost of increased risks of digital attacks. The typical defense against digital attacks is anti-virus or anti-malware software. A problem with current defensive software is an assumption that the attack is a single stage attack.

A digital attack, also known as a "kill chain" has the following phases.

1. Reconnaissance (research, identification, and selection of targets). This phase may include harvesting of email addresses, conference information, etc. The attackers will attempt to "case the joint" of the target to identify the organizational structure, IT system, and other data that will be used in attempting the breach.
2. Weaponization (pairing remote access malware with an exploit into a deliverable payload). This often requires engineering core malware to suit the target and the attacker's goals. The attackers seek to find previously unexploited vulnerabilities to reduce detection by traditional protection systems.
3. Delivery (transmission of weapon to target, such as via email attachments, websites, or USB drives). A target may proscribe removable media, but severe limits on email and interne usage may be an unacceptable compromise of the targets operations, so that this delivery path is typically available.
4. Exploitation (trigger the code, exploiting vulnerable applications or systems). After delivery, exploitation (e.g., usage) triggers the malware. If the malware exploits an unknown vulnerability, also known as a "zero day" attack, the risk is high of an unknown infection.
5. Installation (the weapon installs a backdoor on a target's system, allowing persistent access). This allows the attacker to maintain persistence inside the target environment. This is a critical point of defense and is often missed.
6. Command and Control (an outside server communicates with the weapons, providing hands on keyboard access inside the target's network). This is one of the last chances to prevent harm. Even though a system has become vulnerable, if the target can prevent communication with the system by the attacker, or prevent the execution of commands to the system from the attacker, damage can be limited.
7. Actions on Objective (the attacker works to achieve the objective of the intrusion, which can include exfiltration or destruction of data, or intrusion into another target). At this stage the target must initiate prepared reactions to prevent spread and to block data transfers.

The first two phases are not under the control of the defender and are usually controlled by the attacker. The key to attackers accomplishing their goals are the Exploitation and Installation steps. Signature based and ML based Anti-Malware systems used in the prior art provide some level of protection. But attackers are constantly working to defeat these methods. Modern attackers use complex attack techniques to avoid detection and gain a foothold inside the organization. A typical attacker today uses a multi-stage model to successfully compromise an endpoint, be it server or workstation, laptop, mobile device or any such end computing device.

Stage 1—In the first stage, the attacker usually drops an exploit or uses a spear phishing attack or an open vulnerability to compromise the endpoint and load a stage one payload. The job of the stage 1 execution is to set the stage for the malicious payload in stage 2 or 3.

Stage 2—The first stage execution downloads the second stage malicious payload, which then executes unhindered on the endpoint providing the attacker an opportunity to accomplish the attacker's objectives.

Stage 3 Plunder and profit—Once the compromise is successful, depending on the payload, the attacker either steals data, maintains persistence and steals passwords, hijacks browsers and/or encrypts the systems (ransomware). Recently, ransomware attackers have been notorious for stealing data before encrypting the endpoint and then holding organizations ransom, threatening to post the data publicly. This has turned out to be a very effective tactic as it opens up organizations for libel and are thus more willing to pay the ransom.

Ransomware like Maze have adopted these multi-stage attack techniques to cause havoc across enterprise network infrastructures, disabling the anti-virus and anti-malware solutions on the endpoints.

Traditionally the anti-malware and anti-virus companies have been helpless in solving these problems due to the stealth nature of the attacks. They are also plagued by the complexity of the attacks which have now started to utilize native operating system executables to achieve their malicious intent. Modern scripting languages like WMI (Window Management Instruction) and PowerShell (a task automation and configuration management program) have made it very easy for attackers to accomplish in-memory executing without ever touching the disk. If a file never touches the disk, then most anti-malware systems cannot even begin to detect them, further complicating the plight to Anti-Virus and Anti-Malware companies.

Detecting these attacks over the network has not yielded much effort either as the data traffic portion of the traffic used by the attackers is usually encrypted using TLS or some method of encryption. This renders the network devices blind in a way. Another problem with these modern attacks is that most of the fileless malware is downloaded on the fly as code/text, not as a binary anymore. In some cases, it is also downloaded as a certificate file. None of the network perimeter devices can handle/analyze these file types and hence they get into the network unabated.

When a malware is downloaded as a script or as a certificate for in-memory execution, endpoint protection tools cannot detect this activity. Endpoint Detection and Response tools that are available in the market try to help with this understanding to an extent, but they fail often as they are only effective in detecting post execution and are powerless to stop the activity from ever happening.

Anti-Malware and Anti-Virus systems have largely depended on supervised and unsupervised machine learning models to detect malware. While this has been successful in the beginning, they are not effective when it comes to detecting modern malware.

Supervised machine learning models most popular with endpoint protection systems rely heavily on processing large amounts of known malware (training data) usually in binary form. The algorithms process large amounts of datasets usually in TB, and build a limited set of features that can be reliably used to detect malware. A model with these features is then built and used to detect potentially new malware. The advantage of using Supervised machine learning models is that they are very fast with relatively good accuracy in detecting malware with familiar patterns. They fail completely when it comes to analyzing zero-day malware and/or fileless malware.

Unsupervised ML models are good at detecting anomalies without any training data. They pick outliers from any given data set and the resulting outliers are processed with additional inputs to predict anomalies. This makes them a good candidate for most network-based anomaly detection tools. They are largely useless in detecting malware itself.

As noted both of these methods are failing at reliably stopping modern day multi-stage malware that is increasingly relying on native tools instead of malicious files. These methods are primarily designed to predict and detect malware binaries or network anomalies. They are powerless against zero-day, fileless malwares of today.

SUMMARY

The system implements in memory decoys to disrupt the attacker techniques. This has multiple benefits. 1) The attacker is never aware of a decoy present in memory as it is virtually indistinguishable from any regular process on an endpoint. 2) The decoys process also tracks attacker activity from a behavior perspective and predict and preempt the attackers next steps without alerting the attacker. 3) the decoy processes can then provide false information by intercepting the kernel responses to the attackers process and disrupt the attack chain. 4) the decoy processes can also pollute the responses that the attacker is expecting, thereby preventing the attacker from ever achieving execution of the endpoint. 5) The decoy processes also detect the attacker's evasion techniques and adjust accordingly to divert the attacker from ever achieving execution.

The system does not rely on any prior knowledge of the attacker or the attacker's specific attack patterns. The system also does not rely on any training data or list of hashes or signatures. This enables the system to exist in stealth with a very low memory footprint, as opposed to the current day Anti-Malware and Anti-Virus systems that are a memory bloat.

DETAILED DESCRIPTION OF THE SYSTEM

The system in an embodiment uses In-Memory decoy(s) to protect against malware attacks, including multi-stage malware attacks. An In-Memory decoy is a concept of detecting suspicious process behavior using a kernel driver. Once suspicious processes are detected using behavior tree models, the decoys take over and inject themselves into the communication and provide incorrect responses to the requesting suspicious process. The goal is to disrupt the attack chain of the attacker at the execution cycle, so the attacker's payload never gets to execute. The In-Memory Decoy can also disrupt the execution process by returning null responses resulting in failed executions.

Since the method tracks process activity on the endpoint, it doesn't matter if the attacker uses an exe, malicious DLL, script or any fileless attacks and in-memory attacks. This also ends up being an effective way to block process injection techniques, process hijacks and process doppelganging techniques including process hollowing. The system also works well for preventing Ransomware attacks at the execution phase.

Figure 1:
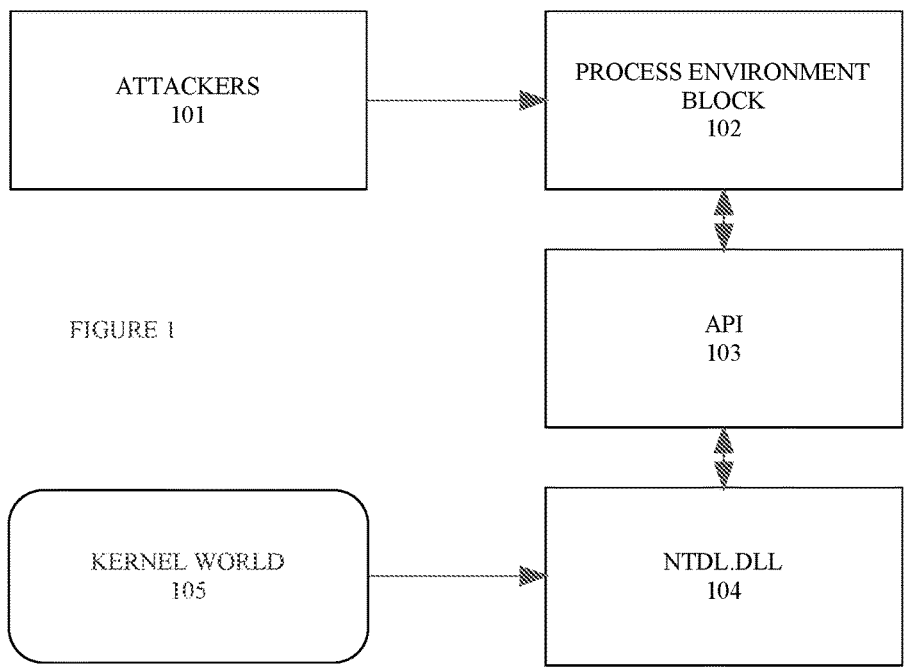
FIG. 1 is an example execution cycle.

An example execution cycle of either a script or executable of either malware, trojan, exploit, ransomware and/or APT is as shown in FIG. 1. Attackers 101 (e.g. DLL Injection/Exploits; Trojans/Malware, Ransomware, APT Techniques, and the like) use the Process Environment Block 102 (PEB). The Process Environment Block 102 is a data structure in the Windows NT operating system family. It is used internally and is not intended for use by anything other than the operating system.

The PEB 102 calls relevant Windows API 103 calls. In one embodiment, the API is the native API used by Windows NT and other user mode applications. It is typically used in the startup process when other components and APIs are not yet available. An attack on the PEB 102 and API 103 during startup prevents malware tools from being used because they have not yet loaded.

API 103 in turn communicates via NTDLL.DLL 104. NTDLL.DLL is a file (NT layer DLL) containing NT kernel functions and is found in the windows directory. This file has been identified by Microsoft as a security risk This file communicates with the windows kernel world 105 to execute the actions/instructions.

Figure 2:
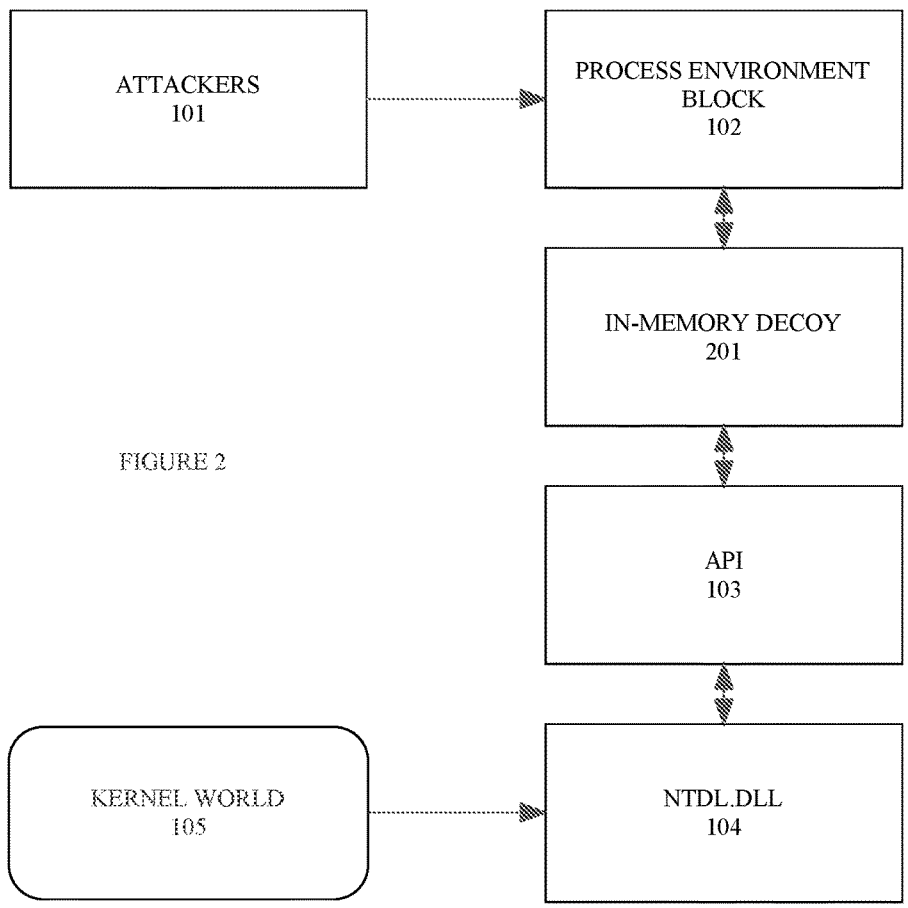
FIG. 2 is an example instruction cycle.

The system can stop attacks using the path of FIG. 1 by the use of at least one in-memory decoy to intercept calls between the Process Environment Block 102 and Win API 103. An embodiment of the system is illustrated in the instruction cycle of FIG. 2. Using an In-Memory Decoy 201 the system can intercept calls made by Process Environment Block 102 and track the behavior of the process. The In-Memory Decoy 201 will act as a pass-thru for the calls to Windows APIs 103. This allows tracking of all instructions that are initiated by all processes on the endpoint. Even if scripts are executed, they are often executed by PowerShell, VB or WMI, allowing them to be tracked as well.

The In-Memory decoy intercepts calls to the kernel and can identify bad actors and malware. The decoy can respond to the malware with incorrect data, making the attacker think they have gained access to the target system. Instead, the decoy prevents access to the true kernel and prevents takeover of the target system.

Figure 3:
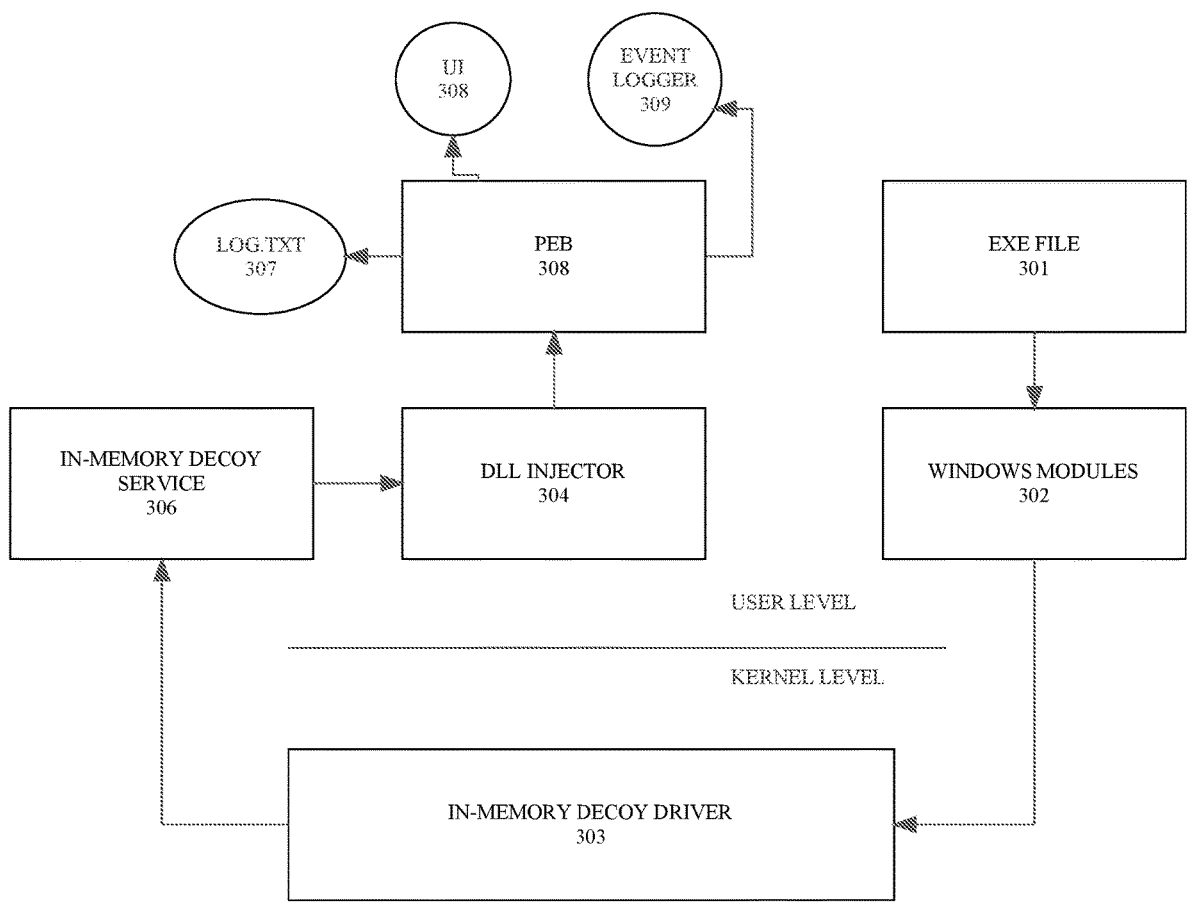
FIG. 3 illustrates an embodiment of the solution.

FIG. 3 illustrates an embodiment of the solution. An EXE file 301 communicates with Windows Modules 302 at the user level. An In-Memory Decoy Driver 303 at the kernel level functions as a kernel driver and interfaces with In-Memory Decoy Service 306 at the user level. The In-Memory Decoy Service 306 is responsible for performing all interactions and providing the instructions on response actions to the In-Memory Decoy Driver 303 in the kernel. The In-Memory Decoy Service 306 allows the system to manage user-mode actions and also provide interfaces to gain an understanding of the user mode actions e.g., detection of executions at DLL Injector 304 and ultimately Process Environment Block 308.

The user mode service also is responsible for logging the actions and also generating appropriate events using the Event Logger 309. The UI 308 interacts with the User Level service to provide user actionable interfaces to the endpoint user.

The system ingests the major, known DLL injection techniques used by malwares, trojans and APTs. This allows the system to see opportunities to stop the injection process just before it is successful. The system uses the process history before taking any action. The system compares the current request with the process history that of that request and can identify possible malicious requests. This reduces false positive rates. When detecting malicious requests, the decoy process will fake the return address and/or flush the memory space address returned thereby causing the process actions to fail. The attacker process thus fails and/or will be unable to accomplish its objectives.

The decoy looks for requests that would likely be made by an attacker, but that would not be made by a legitimate process. For example, because an attacker is seeking to intrude into an unknown system, the attacker may query as to the operating system identification and/or version. The attacker may also be requesting credentials that would not be requested by a legitimate user. When the decoy detects these and other non-conforming requests, the decoy can provide false responses to render the attacker harmless or to fool the attacker into leaving or becoming inert.

In one embodiment, the system relies on process history for various types of attack. For example, for Injection Techniques, the functions "Create Remote Thread", "Process Hollowing", "Windows Hook", and "Using APC" are analyzed using process history. For the function Create Remote Thread, the actions Search Target Process, Open a Process, and Allocate Memory are allowed for all requests. The actions Write Dat to Memory and Create a Thread in Remote Process are flagged for further analysis based on process history. Depending on the process history, those actions will not be allowed because there will be a presumption that they are non-conforming actions and likely from an attacker.

For Process Hollowing, the allowed actions include Create a Suspended Process, Remove Old Image, Allocate Memory, Set Thread Context, and Resume Thread. However, the action Write Data to Memory is analyzed based on process history and is not allowed.

For the Function Windows Hook, the allowed actions include Load a DLL, Get Callback Function Address, and Create a Target Thread. The action Set Hook to an Event is analyzed using process history and is not allowed.

The Using APC function allows Taverse a Target Process, Search and Alterable Thread, and Open the Thread are allowed, while Add APC to the thread is not allowed based on process history.

For Trojan Behavior, Create a Socket and Close the Socket are allowed but Send/Receive data is prohibited. Bind the Socket may be allowed or not depending on analyzing the process history. APT Techniques looks at Recon and Environment Detection and Privilege Escalation functions. Recon and Environment prohibits all functions including Debugger Presence, Sandbox Detection, Service Detection, File & Driver Detection, Registry Detection, etc.

Privilege Escalations allows Open a Legitimate Security Token and Impersonate Security Token. Duplicate Security Token is not allowed and Set Thread Security Token and Create a Process Security Token are analyzed using the process history and based on that, may not be allowed. Ransomware allows Get Crypto Service Provider Access, Generate Key, and Export Key to BLOB (e.g., Binary Large Object), while Encrypt Data is not allowed.

Figure 4:
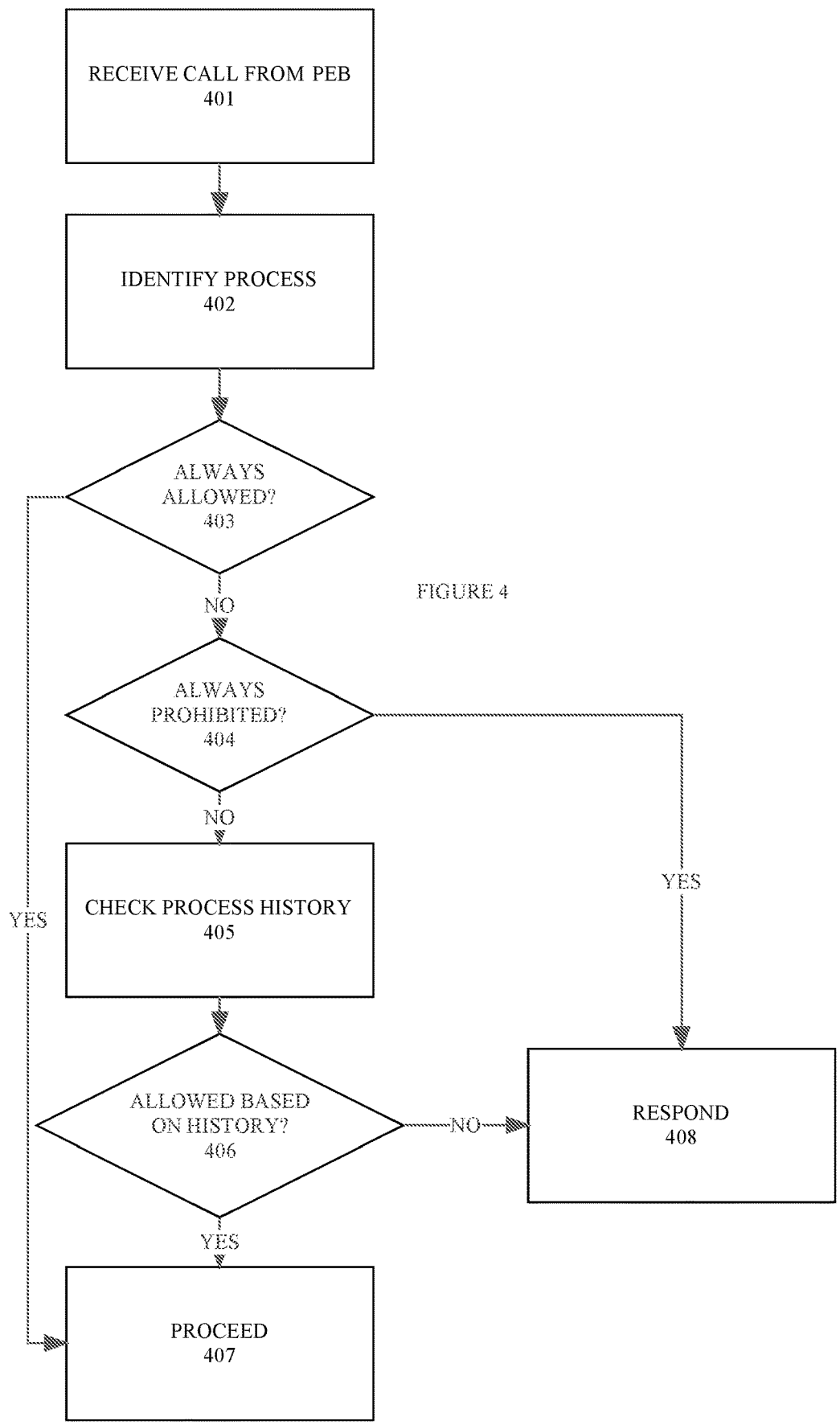
FIG. 4 illustrates an example of an In-Memory decoy in an embodiment of the solution.
Figure 5:
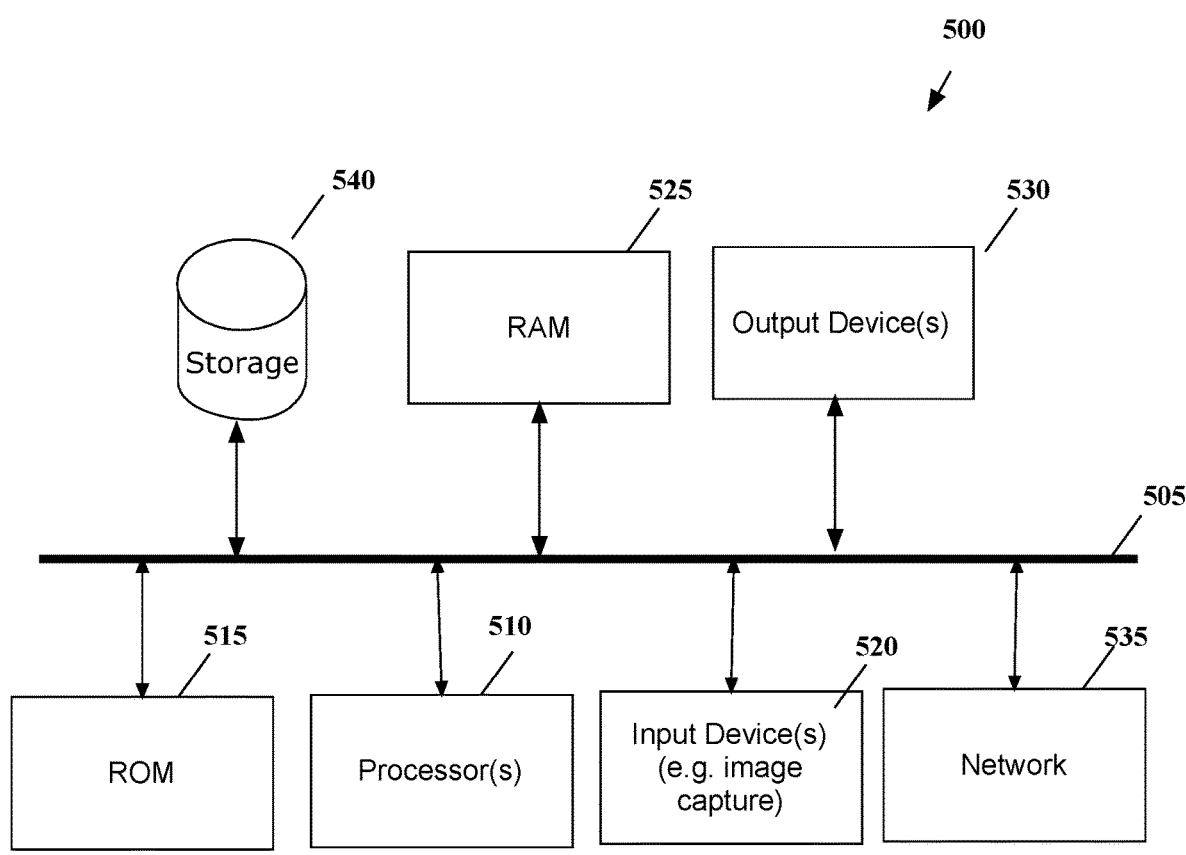
FIG. 5 illustrates an example computer embodiment of the system.

FIG. 4 is a flow diagram illustrating operation of the In-Memory Decoy in an embodiment of the system. At step 401 the In-Memory Decoy receives a call from the Process Environment Block. At step 402 the Decoy identifies the process. At step 403 the Decoy checks to see if the process is one that is always allowed. If so, the system proceeds to step 407 and the process is executed. If not, the system proceeds to decision block 404 to see if the process is one that is always prohibited. If so, the system proceeds to step 408 and the system responds with false responses, including operating system version, log-in credentials, memory locations, and the like.

If the process is not one that is always prohibited at decision block 404, the system analyses the process in light of the process history at step 405. At decision block 406 it is determined if the process is allowed base on the process history. If so, the system proceeds to step 407 and executes the process. If not, the process is stopped and the system proceeds to step 408.

In one embodiment, the process history is used as follows. When an attacker starts an attack, the attacker starts with some level of credentials (access) to the system. Once the attacker gains access, the attacker executes one or more processes to understand the system (environment). These process executions are tracked and then followed through. As the attacker continues on the attack path, the attacker will try to gain elevated privileges (administrator/root/domain admin etc.). These attempts are also tracked. In this manner, tracking a process history or a process chain from initiation to execution will help identify the intent of the attacker. Once the intent is understood, the system can mark this process chain as suspicious. At this point, once the process chain and thereby attacker actions are marked suspicious, any further actions by the attacker are fed wrong responses by the decoy(s) to either subvert the attack or suspend the offending process due to invalid inputs. In this way the attacker's code just fails silently. The advantage of this process is that it does not require a large threat intelligence data set or a static set of allow/blocklists to work. It is dynamic based on behavior of the attacker and the attacker processes.

The system provides a practical solution to cyber-attacks and modifies the operation of a computing system to be more efficient and protected.

FIG. 9 illustrates an exemplary a system 900 that may implement the system. The electronic system 900 of some embodiments may be a mobile apparatus. The electronic system includes various types of machine readable media and interfaces. The electronic system includes a bus 905, processor(s) 910, read only memory (ROM) 915, input device(s) 920, random access memory (RAM) 925, output device(s) 930, a network component 935, and a permanent storage device 940.

The bus 905 communicatively connects the internal devices and/or components of the electronic system. For instance, the bus 905 communicatively connects the processor(s) 910 with the ROM 915, the RAM 925, and the permanent storage 940. The processor(s) 910 retrieve instructions from the memory units to execute processes of the invention.

The processor(s) 910 may be implemented with one or more general-purpose and/or special-purpose processors. Examples include microprocessors, microcontrollers, DSP processors, and other circuitry that can execute software. Alternatively, or in addition to the one or more general-purpose and/or special-purpose processors, the processor may be implemented with dedicated hardware such as, by way of example, one or more FPGAs (Field Programmable Gate Array), PLDs (Programmable Logic Device), controllers, state machines, gated logic, discrete hardware components, or any other suitable circuitry, or any combination of circuits.

Many of the above-described features and applications are implemented as software processes of a computer programming product. The processes are specified as a set of instructions recorded on a machine readable storage medium (also referred to as machine readable medium). When these instructions are executed by one or more of the processor(s) 910, they cause the processor(s) 910 to perform the actions indicated in the instructions.

Furthermore, software shall be construed broadly to mean instructions, data, or any combination thereof, whether referred to as software, firmware, middleware, microcode, hardware description language, or otherwise. The software may be stored or transmitted over as one or more instructions or code on a machine-readable medium. Machine-readable media include both computer storage media and communication media including any medium that facilitates transfer of a computer program from one place to another. A storage medium may be any available medium that can be accessed by the processor(s) 910. By way of example, and not limitation, such machine-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a processor. Also, any connection is properly termed a machine-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects machine-readable media may comprise non-transitory machine-readable media (e.g., tangible media). In addition, for other aspects machine-readable media may comprise transitory machine-readable media (e.g., a signal). Combinations of the above should also be included within the scope of machine-readable media.

Also, in some embodiments, multiple software inventions can be implemented as sub-parts of a larger program while remaining distinct software inventions. In some embodiments, multiple software inventions can also be implemented as separate programs. Any combination of separate programs that together implement a software invention described here is within the scope of the invention. In some embodiments, the software programs, when installed to operate on one or more electronic systems 900, define one or more specific machine implementations that execute and perform the operations of the software programs.

The ROM 915 stores static instructions needed by the processor(s) 910 and other components of the electronic system. The ROM may store the instructions necessary for the processor(s) 910 to execute the processes provided by the system. The permanent storage 940 is a non-volatile memory that stores instructions and data when the electronic system 900 is on or off. The permanent storage 940 is a read/write memory device, such as a hard disk or a flash drive. Storage media may be any available media that can be accessed by a computer. By way of example, the ROM could also be EEPROM, CD-ROM or other optical disk storage, magnetic disk storage or other magnetic storage devices, or any other medium that can be used to carry or store desired program code in the form of instructions or data structures and that can be accessed by a computer.

The RAM 925 is a volatile read/write memory. The RAM 925 stores instructions needed by the processor(s) 910 at runtime, the RAM 925 may also store the real-time video or still images acquired by the system. The bus 905 also connects input and output devices 920 and 930. The input devices enable the user to communicate information and select commands to the electronic system. The input devices 920 may be a keypad, image capture apparatus, or a touch screen display capable of receiving touch interactions. The output device(s) 930 display images generated by the electronic system. The output devices may include printers or display devices such as monitors.

The bus 905 also couples the electronic system to a network 935. The electronic system may be part of a local area network (LAN), a wide area network (WAN), the Internet, or an Intranet by using a network interface. The electronic system may also be a mobile apparatus that is connected to a mobile data network supplied by a wireless carrier. Such networks may include 3G, HSPA, EVDO, and/or LTE.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The various aspects of this disclosure are provided to enable one of ordinary skill in the art to practice the present invention. Various modifications to exemplary embodiments presented throughout this disclosure will be readily apparent to those skilled in the art, and the concepts disclosed herein may be extended to other apparatuses, devices, or processes. Thus, the claims are not intended to be limited to the various aspects of this disclosure, but are to be accorded the full scope consistent with the language of the claims. All structural and functional equivalents to the various components of the exemplary embodiments described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 18(f) unless the element is expressly recited using the phrase "means for" or, in the case of a method claim, the element is recited using the phrase "step for."

FIG. 9 illustrates an exemplary a system 500 that may implement the system. The electronic system 500 of some embodiments may be a mobile apparatus. The electronic system includes various types of machine readable media and interfaces. The electronic system includes a bus 505, processor(s) 510, read only memory (ROM) 515, input device(s) 520, random access memory (RAM) 525, output device(s) 530, a network component 535, and a permanent storage device 540.

The bus 505 communicatively connects the internal devices and/or components of the electronic system. For instance, the bus 505 communicatively connects the processor(s) 510 with the ROM 515, the RAM 525, and the permanent storage 540. The processor(s) 510 retrieve instructions from the memory units to execute processes of the invention.

The processor(s) 510 may be implemented with one or more general-purpose and/or special-purpose processors. Examples include microprocessors, microcontrollers, DSP processors, and other circuitry that can execute software. Alternatively, or in addition to the one or more general-purpose and/or special-purpose processors, the processor may be implemented with dedicated hardware such as, by way of example, one or more FPGAs (Field Programmable Gate Array), PLDs (Programmable Logic Device), controllers, state machines, gated logic, discrete hardware components, or any other suitable circuitry, or any combination of circuits.

Many of the above-described features and applications are implemented as software processes of a computer programming product. The processes are specified as a set of instructions recorded on a machine readable storage medium (also referred to as machine readable medium). When these instructions are executed by one or more of the processor(s) 510, they cause the processor(s) 510 to perform the actions indicated in the instructions.

Furthermore, software shall be construed broadly to mean instructions, data, or any combination thereof, whether referred to as software, firmware, middleware, microcode, hardware description language, or otherwise. The software may be stored or transmitted over as one or more instructions or code on a machine-readable medium. Machine-readable media include both computer storage media and communication media including any medium that facilitates transfer of a computer program from one place to another. A storage medium may be any available medium that can be accessed by the processor(s) 510. By way of example, and not limitation, such machine-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a processor. Also, any connection is properly termed a machine-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects machine-readable media may comprise non-transitory machine-readable media (e.g., tangible media). In addition, for other aspects machine-readable media may comprise transitory machine-readable media (e.g., a signal). Combinations of the above should also be included within the scope of machine-readable media.

Also, in some embodiments, multiple software inventions can be implemented as sub-parts of a larger program while remaining distinct software inventions. In some embodiments, multiple software inventions can also be implemented as separate programs. Any combination of separate programs that together implement a software invention described here is within the scope of the invention. In some embodiments, the software programs, when installed to operate on one or more electronic systems 500, define one or more specific machine implementations that execute and perform the operations of the software programs.

The ROM 515 stores static instructions needed by the processor(s) 510 and other components of the electronic system. The ROM may store the instructions necessary for the processor(s) 510 to execute the processes provided by the system. The permanent storage 540 is a non-volatile memory that stores instructions and data when the electronic system 500 is on or off. The permanent storage 540 is a read/write memory device, such as a hard disk or a flash drive. Storage media may be any available media that can be accessed by a computer. By way of example, the ROM could also be EEPROM, CD-ROM or other optical disk storage, magnetic disk storage or other magnetic storage devices, or any other medium that can be used to carry or store desired program code in the form of instructions or data structures and that can be accessed by a computer.

The RAM 525 is a volatile read/write memory. The RAM 525 stores instructions needed by the processor(s) 510 at runtime, the RAM 525 may also store the real-time video or still images acquired by the system. The bus 505 also connects input and output devices 520 and 530. The input devices enable the user to communicate information and select commands to the electronic system. The input devices 520 may be a keypad, image capture apparatus, or a touch screen display capable of receiving touch interactions. The output device(s) 530 display images generated by the electronic system. The output devices may include printers or display devices such as monitors.

The bus 505 also couples the electronic system to a network 535. The electronic system may be part of a local area network (LAN), a wide area network (WAN), the Internet, or an Intranet by using a network interface. The electronic system may also be a mobile apparatus that is connected to a mobile data network supplied by a wireless carrier. Such networks may include 3G, HSPA, EVDO, and/or LTE.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The various aspects of this disclosure are provided to enable one of ordinary skill in the art to practice the present invention. Various modifications to exemplary embodiments presented throughout this disclosure will be readily apparent to those skilled in the art, and the concepts disclosed herein may be extended to other apparatuses, devices, or processes. Thus, the claims are not intended to be limited to the various aspects of this disclosure, but are to be accorded the full scope consistent with the language of the claims. All structural and functional equivalents to the various components of the exemplary embodiments described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 18(f) unless the element is expressly recited using the phrase "means for" or, in the case of a method claim, the element is recited using the phrase "step for."

Thus, an in-memory decoy has been described.

What is claimed is:

1. A method of preventing cyber attacks comprising:
   providing an in-memory decoy driver in a processing system at a kernel level;
   providing an in-memory decoy service at a user level;
   intercepting processes using the in-memory decoy driver and in-memory decoy service wherein the intercepted processes are from a process environment block and are intended for an Application Programming Interface (API) and are intercepted prior to reaching the API;
   determining if the intercepted processes are always permitted or always prohibited and allowing execution of intercepted processes that are always permitted, prohibiting execution of intercepted processes that are always prohibited, and identifying intercepted processes that are neither always permitted nor always prohibited as an intercepted process to be analyzed;
   reviewing the process history of the intercepted processes to be analyzed and determining if the intercepted processes to be analyzed is permitted based on a process history of the intercepted processes from initiation to execution and identifying intercepted processes to be analyzed as a suspicious processes when the intercepted processes to be analyzed are not permitted based on the process history;
   using the in-memory decoy to provide false responses to the suspicious processes, indicating that the suspicious process that is not permitted is from an attacker;
   tracking execution of suspicious processes of the attacker to generate a process chain of the attacker;
   marking the process chain as suspicious and suspending the execution of suspicious processes of the attacker.

2. The method of claim 1 wherein the intercepted process is analyzed to determine if it is permitted.

3. The method of claim 2 wherein the process is analyzed in light of a process history associated with the intercepted process.

4. The method of claim 3 wherein the execution of the intercepted process is prevented based on the analysis.

5. The method of claim 3 wherein the execution of the intercepted process is permitted based on the analysis.

* * * * *